United States Patent
Zander et al.

[11] Patent Number: 6,037,860
[45] Date of Patent: Mar. 14, 2000

[54] METHOD AND ARRANGEMENT FOR AVOIDING AND/OR MINIMIZING VEHICLE COLLISIONS IN ROAD TRAFFIC

[75] Inventors: André Zander, Halberstadt; Uwe Wiesner, Braunschweig, both of Germany

[73] Assignee: Volkswagen AG, Wolfsburg, Germany

[21] Appl. No.: 09/156,931

[22] Filed: Sep. 18, 1998

[30] Foreign Application Priority Data

Sep. 20, 1997 [DE] Germany ................... 197 41 631

[51] Int. Cl.[7] ................................................. B60Q 1/00
[52] U.S. Cl. ................... 340/436; 340/438; 340/903; 307/10.1; 701/45
[58] Field of Search ................. 340/435, 436, 340/438, 901, 903; 307/10.1, 10.2, 10.3, 10.4; 180/167, 169, 273, 287; 701/45, 301

[56] References Cited

U.S. PATENT DOCUMENTS

| | | | |
|---|---|---|---|
| 3,687,213 | 8/1972 | Sato et al. | 280/735 |
| 5,314,037 | 5/1994 | Shaw et al. | 180/169 |
| 5,410,304 | 4/1995 | Hahn et al. | 340/903 |
| 5,594,413 | 1/1997 | Cho et al. | 340/435 |
| 5,646,612 | 7/1997 | Byon | 340/903 |
| 5,706,909 | 1/1998 | Bevins et al. | 180/273 |
| 5,825,098 | 10/1998 | Darby et al. | 307/10.1 |

FOREIGN PATENT DOCUMENTS

| | | |
|---|---|---|
| 0439979 | 8/1991 | European Pat. Off. . |
| 0545437 | 6/1993 | European Pat. Off. . |
| 0679976 | 11/1995 | European Pat. Off. . |
| 3637165 | 5/1988 | Germany . |
| 3830790 | 3/1990 | Germany . |
| 4112579 | 10/1991 | Germany . |
| 4023109 | 1/1992 | Germany ................ B60R 21/32 |
| 4128608 | 3/1992 | Germany ................ B60R 21/32 |
| 4128041 | 2/1993 | Germany ................ G08G 1/00 |
| 4128312 | 3/1993 | Germany ................ G08G 1/00 |
| 4310354 | 10/1993 | Germany . |
| 4214817 | 11/1993 | Germany ................ B60Q 9/00 |
| 4332612 | 4/1994 | Germany ................ B60Q 9/00 |
| 4338244 | 5/1994 | Germany ................ B60Q 9/00 |
| 4335979 | 4/1995 | Germany . |
| 4446642 | 6/1996 | Germany ................ G06K 9/60 |
| 19512681 | 10/1996 | Germany . |
| 196 09 488 | 10/1996 | Germany ................ G08G 1/16 |
| 196 17 405 | 11/1996 | Germany ................ B60R 21/32 |
| 19647283 | 5/1997 | Germany . |
| 19654587 | 6/1997 | Germany ................ G01S 13/93 |
| 2266803 | 11/1993 | United Kingdom ............ G08G 1/16 |
| 2289786 | 5/1995 | United Kingdom ............ B60R 21/32 |
| 9506305 | 3/1995 | WIPO . |

*Primary Examiner*—Daniel J. Wu
*Assistant Examiner*—Van T. Trieu
*Attorney, Agent, or Firm*—Baker Botts L.L.P.

[57] ABSTRACT

In the method and arrangement for avoiding and/or minimizing collision situations in road traffic described in the specification, a first plurality of sensors provides a representation of the surroundings of the motor vehicle, a second plurality of sensors senses the vehicle operating characteristics and a seat occupancy detector detects seat occupancy in the vehicle. The data relating to the surroundings and the vehicle operating characteristics are supplied to an evaluation unit which is connected to a plurality of vehicle control actuators which are actuated, if necessary, based on seat occupancy in the vehicle to avoid a collision or to produce in the minimum damage in a collision.

6 Claims, 1 Drawing Sheet

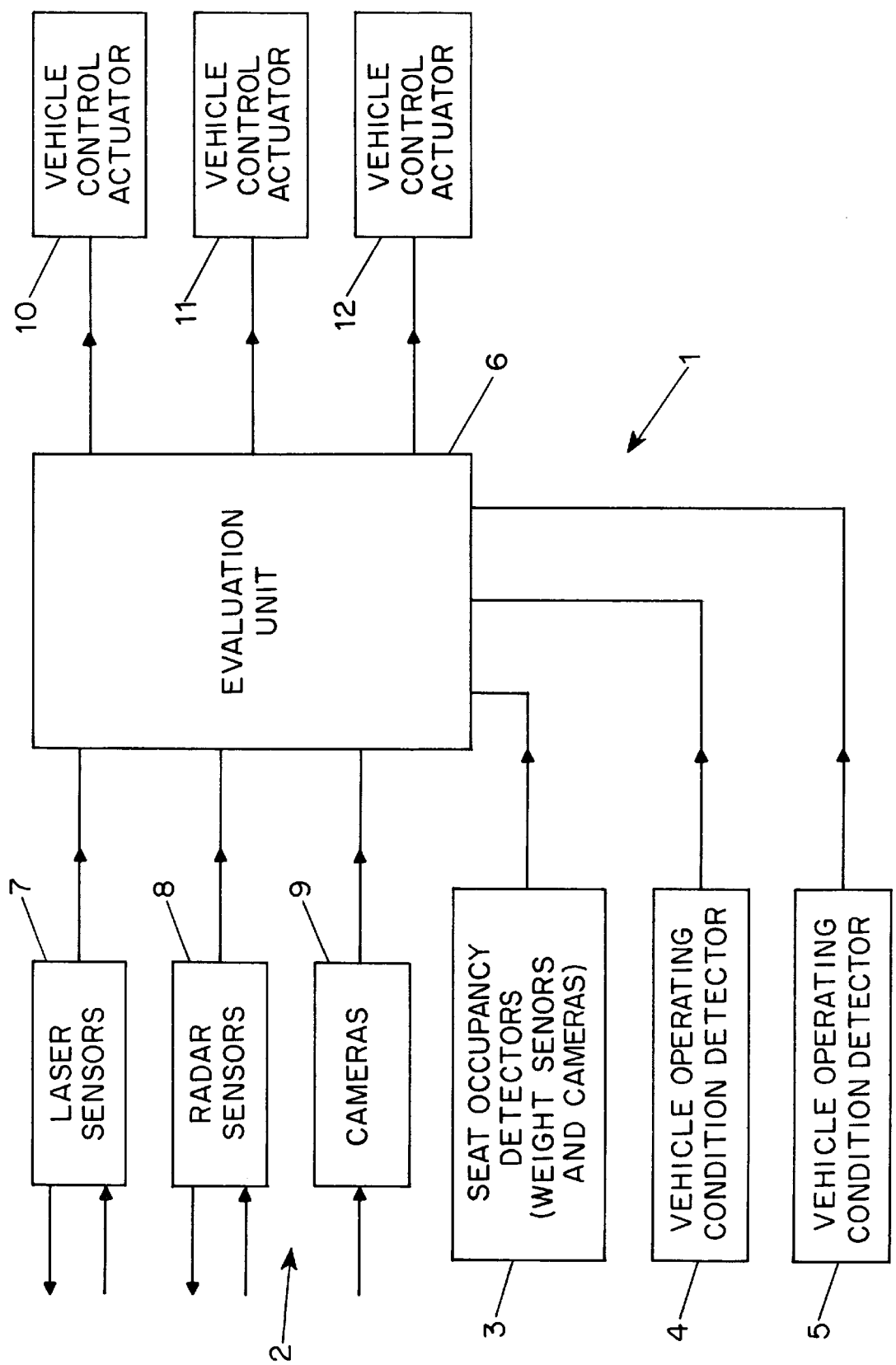

METHOD AND ARRANGEMENT FOR AVOIDING AND/OR MINIMIZING VEHICLE COLLISIONS IN ROAD TRAFFIC

BACKGROUND OF INVENTION

This invention relates to methods and arrangements for avoiding and/or minimizing vehicle collisions in road traffic.

The last few years have seen a rapid rise in the density of traffic on the roads, and in the flood of information available to a driver. Driving motor vehicles is thus becoming a complex procedure in which the vehicle driver can find himself in critical situations with which he is unable to cope.

For this reason, it is important to relieve the driver of a vehicle in particular in critical situations. So-called driver assistance systems are available to alert the driver of a vehicle to specific dangers. Thus, in order to define a degree of danger to which a vehicle is subjected because of dense traffic and low visibility, U.S. Pat. No. 5,410,304 describes an arrangement for sensing the spacing of a vehicle from the vehicle travelling ahead using distance-sensing devices, determining the relative speed between the two vehicles and/or between the vehicle and an obstacle using an infrared visibility measuring system, and detecting the current visibility and the instantaneous speed of the vehicle and its steering angle. In a first method step, a measure of a safe distance from a vehicle travelling in front and/or from an obstacle is established as a function of these variables, and an indication of an instantaneous vehicle speed, which can be increased or reduced if appropriate, is displayed. In a second method step, a vehicle speed which is still safe is calculated as a function of the measured visibility, and this speed value is compared with the safe distance speed value, the lower and/or the more negative of the two values being displayed in order to warn the driver of the vehicle. Such a driver assistance system, however, can only make an indirect contribution to the avoidance of accidents since it depends on the acceptance of the displayed information by the driver of the vehicle.

Furthermore, in the last few years, passive safety systems such as airbags and side impact protection systems have been incorporated into motor vehicles. These systems have in common the fact that they cannot be activated until an impact has taken place. Thus, such safety systems cannot prevent a collision from occurring but can only reduce its consequences for the occupants of the motor vehicle.

Furthermore, in the last few years, passive safety systems such as airbags and side impact protection systems have been incorporated into motor vehicles. These systems have in common the fact that they cannot be activated until an impact has taken place. Thus, such safety systems cannot prevent a collision from occurring but can only reduce its consequences for the occupants of the motor vehicle.

Furthermore, various seat-occupation detection devices are known by which it is possible to detect whether a vehicle seat is occupied. This information is required, for example, to determine whether or not a front seat passenger's airbag should be triggered in a collision. In addition, a seat-occupation detection device can also be used to sense the type of physiognomy of a person sitting on the vehicle seat by activating, for example, video cameras, weight sensors or the like. On the basis of the physiognomy which is sensed, the gas pressure of the airbag can then be appropriately controlled so that injuries resulting from the triggering of the airbag can be avoided.

It becomes possible to avoid an accident by using active safety systems such as an anti-lock braking system (ABS). However, the prerequisite for the response of an ABS is that the driver has detected the risk of an accident and initiates an appropriately high rate of deceleration. Thus, the successful use of active safety systems likewise depends directly on the driver of the vehicle. For this reason, methods and devices have been developed for preventing a collision with a vehicle travelling in front. These devices are capable, because of a certain degree of independence, of avoiding rear-end collisions.

As an example, the European Patent EP 545 437 describes a method for avoiding collisions of motor vehicles. In that method, the output signal of a distance-measuring device is supplied to an evaluation unit. The detection range of the distance-measuring device is divided into a series of safety zones which are at different distances from the vehicle and to which individual reaction measures are assigned. Such a reaction measure is primarily an indication of an imminent collision to the driver of a vehicle. If the driver of the vehicle does not react to this indication, appropriate action to reduce the risk of collision is automatically initiated. Vehicle-specific parameters such as speed and further factors which affect the acceleration characteristics such as the load of the motor vehicle and the condition of the roadway, as well as the visibility, are taken into account in the definition of the safety zones. However, such a system only reacts to a motor vehicle travelling ahead or to an obstacle located in front of the vehicle by a warning or by a braking intervention in order to prevent a collision with the motor vehicle or obstacle ahead.

German Offenlegungsschrift No. 196 47 283 discloses an arrangement for avoiding and/or minimizing collisions in road traffic which has sensors for sensing individual parts of the surroundings of a motor vehicle supplied with the arrangement. These individual items of information relating to the surroundings can, in the simplest case, be output signals of sensors for detecting, for one or more obstacles, at least the distance and the relative speed between the motor vehicle and the obstacle which has been detected, and its size, in order to classify the obstacles.

In addition, the sensors for sensing individual parts of the surroundings of the vehicle may advantageously also include devices for determining the course of the road, for example, the radii of bends in he road, the prevailing visibility and the condition of the road surface or, for example, detectors for detecting road signs and/or notice signs and/or traffic lights.

From this collection of information relating to individual parts, a representation or model of the surroundings of the vehicle is produced and supplied to an evaluation unit for evaluating the representation and/or the parts of the representation. In addition, the operating characteristics of the motor vehicle are sensed by further sensors, for example sensors which sense the travel direction and the longitudinal and transverse movements or speeds of the vehicle. The output signals from these sensors are transmitted to an evaluation unit for evaluating the instantaneous vehicle driving characteristics.

Both the output signals from the evaluation unit for evaluating the representation and/or parts of this representation and the output signals from the evaluation unit for evaluating the operating characteristics of the motor vehicle are supplied to a processing device which determines from these output signals a physical parameter limit for the avoidance of a collision situation. If this physical parameter limit is reached or exceeded, downstream control devices generate control signals for influencing the driving functions of the motor vehicle, at least a braking/acceleration device and/or a steering device for the motor vehicle, depending on the output signals from the evaluation unit for evaluation of the representation of the surroundings and of the evaluation unit for evaluating the operating characteristics of the motor vehicle, i.e. the devices which influence the driving functions of the motor vehicle are acted on directly.

After the driving functions of the vehicle have been taken over by the vehicle control device, its function is to defuse the imminent collision situation, i.e. to avoid an accident. In individual cases, this will not always be possible. Consequently, the unit for generating control signals for the active driving functions will also transmit control signals for activating the passive safety systems, for example airbags, a hazard flashing light system or an emergency call device.

In cases in which a danger has been detected in good time, but, under certain circumstances, a collision situation is unavoidable, the arrangement carries out a measure for limiting damage by, for example, preferring a collision with a rubbish bin on the sidewalk to a collision with a person on the road.

SUMMARY OF THE INVENTION

Accordingly, it is an object of the present invention to provide a method and arrangement for avoiding or minimizing vehicle collisions which overcomes disadvantages of the prior art.

Another object of the invention is to provide a method and arrangement for avoiding and/or minimizing collisions by which damage in the event of unavoidable collisions is further minimized.

These and other objects of the invention are attained by providing a method and arrangement in which sensors detect the surrounding environment of the motor vehicle as well as its operating characteristics and an evaluating unit detects a potential collision and determines appropriate action, and in which seat occupancy sensors provide seat occupancy signals to the evaluation unit. By providing a seat-occupancy detection device for supplying control signals in the event of an unavoidable collision, it is possible to determine to a greater degree a collision course by which injury, especially to persons, is minimized. The invention utilizes the existing protection zones of a vehicle collision detecting system in an optimum way in each case. Thus, for example, a collision of another vehicle or an object against an unoccupied front seat passenger's door or against the lateral region of an unoccupied front seat passenger's side may be much less dangerous for the driver of the vehicle than a head-on collision. However, the situation takes on different aspects if the front passenger seat is occupied, since then the previously described collision could be lethal for the front seat passenger. In this case, a direct collision could be more favourable in terms of the consequences for injuries to the both driver and front seat passenger, The knowledge that the seat is occupied thus provides a further degree of freedom in order to minimize injury or damage in the event of a collision.

BRIEF DESCRIPTION OF THE DRAWING

Further objects and advantages of the invention will be apparent from a reading of the following description in conjunction with the accompanying single drawing figure which is a schematic block diagram illustrating a representative embodiment of an arrangement for avoiding and/or minimizing collision situations in road traffic in accordance with the invention.

DESCRIPTION OF PREFERRED EMBODIMENTS

In the typical embodiment of the invention shown in the drawing, an arrangement 1 for avoiding and/or minimizing collision situations in road traffic includes an apparatus 2 for providing a representation of the surroundings of a motor vehicle, a seat-occupancy detection device 3, sensors 4 and 5 for sensing vehicle operating conditions and an evaluation unit 6. The apparatus 2 for providing a representation of the vehicle surroundings includes a number of laser sensors 7, radar sensors 8 and thermal imaging and other cameras 9 or a combination thereof, which are designed so that they sense the surroundings of the vehicle completely. The combination of the various sensors 7–9 not only provides a certain degree of redundancy, but also provides optimum adaptation to the respective prevailing conditions of the surroundings. Thus, for example, the reliability of the laser sensors 7 decreases considerably in rain or snow, but that of the radar sensors 8 does not. On the other hand, when it is dark the sensing capabilities of video cameras are greatly restricted, but not those of laser sensors 7, radar sensors 8 or a thermal imaging camera 9. The sensed data of the apparatus 2 are continuously passed on to the evaluation unit 6 and combined there to form a complete picture of the surroundings, the evaluation of the data by the sensors 7–9 being carried out as a function of the weather conditions and the time of day which are also supplied to the evaluation unit 6.

In addition, the evaluation unit 6 can also access information stored in a digital map of a navigation system. The picture of the surroundings which is generated includes the layout of the roads, emergency maneuvering room, the number, distance and respective relative speed of objects and/or obstacles and a classification of the objects. The object classification determines predominantly whether the objects are unprotected persons, such as pedestrians or cyclists, protected persons such as drivers of other motor vehicles, or inanimate objects. The sensors 4 and 5 for sensing vehicle operating characteristics sense the speed of the vehicle, the coefficient of friction of the tires with the underlying road surface, the current steering angle and similar data which are also supplied to the evaluation unit 6.

The evaluation unit 6 tests whether described safety spacing conditions with respect to other motor vehicles are being complied with, and whether the motor vehicle is on a collision course with a sensed object. If it is determined during this testing that all the safety distances are being complied with, and also that there is no other risk of collision, the evaluation unit 6 does not generate any control signal for a series of vehicle control actuators 10–12. The vehicle control actuations 10–12 are, for example, the braking, acceleration and steering devices for the motor vehicle, which are preferably designed as x-by-wire systems. X-by-wire systems are mechanically decoupled devices in which a mechanical adjustment movement is converted into an electrical adjustment signal which is fed to a control unit and the control unit then actuates the actual vehicle control component in a purely electrical way. An electrical connection between the evaluation unit 6 and the control units of the x-by-wire systems thus enables automatic intervention into the vehicle control system to be implemented very easily.

If, on the other hand, the result of the testing by the evaluation unit 6 is that, for example, a safety spacing is too short, the evaluation unit calculates a collision avoidance strategy in order to defuse the traffic situation. In the simplest case, this is an adjustment signal by which the speed of the motor vehicle is adapted to that of the sensed object, with the result that the necessary safety spacing is established and maintained. If such a strategy is no longer possible because, for example, the spacing is already too short, the evaluation unit determines whether an avoidance strategy without a collision is possible by, for example, steering the vehicle into a traffic-free area. If the result of the testing by the evaluation unit 6 is that an avoidance strategy with which a collision can still be prevented is no longer possible, a targeted collision condition is carried out.

For this purpose, the evaluation unit 6 calculates various collision strategies. Then the various collision strategies are evaluated taking into account the seat occupancy sensed by the seat-occupancy detection device 3 as a function of the respective severity of damage or injury. For this purpose, a collision strategy in which there are no injuries to persons is preferably selected, i.e. a collision with an inanimate object is carried out if this does not involve the driver and further vehicle occupants being subjected to excessive danger. For this purpose, the motor vehicle is actuated in such a way that most of the impact energy is absorbed by unoccupied areas of the vehicle, i.e. the vehicle is turned with the unoccupied areas towards the object with which it is colliding. If the vehicle is completely occupied, the area of the vehicle which can absorb the greatest degree of impact energy as a crush zone is selected. A similar evaluation is applied as appropriate if a collision is carried out with another occupied vehicle. For this purpose, it is possible, for example, in order to estimate damage or injury, to sense the seat occupancy of the other vehicle involved in a collision by way of the camera 9 and to take this into account as well in the collision strategy. An additional evaluation factor may be, for example, the classification of the occupancy which is sensed by the seat-occupancy detection device 3, which determines for example, whether the seat is occupied by a baby, a small child or an adult. For this purpose, the seat-occupancy detection device 3 may be a camera or a weight sensor providing signals from which conclusions regarding the seat occupant can be drawn. In order to reduce error arising from the seat position, the weight sensor can be combined with an angle-of-inclination of the backrest sensor and/or a foot-position sensor. Since babies and small children exhibit a much more sensitive reaction to an impact, a strategy in which the injuries to them are minimized is then preferably selected.

Although the invention has been described herein with reference to the specific embodiments, many modifications and variations therein will readily occur to those skilled in the art. Accordingly, all such variations and modifications are included within the intended scope of the invention.

We claim:

1. An arrangement for avoiding and/or minimizing motor vehicle collision situations in road traffic, comprising a plurality of sensors for sensing a representation of surroundings of a motor vehicle, another plurality of sensors for sensing vehicle operating characteristics, an evaluation unit to which data relating to the surroundings of the motor vehicle and the vehicle operating characteristics data are supplied for determining a collision strategy if collision avoidance is not possible, a plurality of actuators for controlling operating characteristics and determining the movement of the vehicle, and a seat occupancy detector for detecting seat occupancy and supplying corresponding signals to the evaluation unit, whereby the evaluation unit generates seat-occupancy-dependent control signals for the actuators for controlling operating characteristics of the vehicle in accordance with a collision strategy which is dependent upon seat occupancy information supplied by the seat occupancy detector.

2. An arrangement according to claim 1 wherein the seat occupancy detector comprises a plurality of weight sensors assigned to corresponding vehicle seats.

3. An arrangement according to claim 1 wherein the seat occupancy detector comprises at least one camera.

4. An arrangement according to claim 1 wherein the plurality of sensors for sensing a representation of the surroundings comprises at least one of the group consisting of a camera, a laser sensor and a radar sensor.

5. An arrangement according to claim 4 wherein one of the plurality of sensors is a video camera or a thermal imaging camera.

6. A method for avoiding and/or minimizing collision situations in road traffic by utilizing a plurality of sensors for sensing a representation of surroundings of a motor vehicle, another plurality of sensors for sensing vehicle operation characteristics, an evaluation unit for determining a collision strategy if collision avoidance is not possible, a seat occupancy detector and vehicle control actuators for controlling operating characteristics and determining the movement of the vehicle comprising the following method steps:

a) passing data sensed by the sensors for sensing a continuous representation of the surroundings and by the sensors for sensing vehicle operation characteristics continuously to the evaluation unit, b) passing the data from the seat occupancy detector to the evaluation unit, c) evaluating a current traffic situation for compliance with selected safety criteria, d) generating in the evaluation unit control signals for the vehicle control actuations to carry out a collision avoidance strategy if a safety criterion is infringed so as to cause the vehicle to comply with the infringed safety criteria, e) calculating various sets of control signals for carrying out a targeted collision strategy is an avoidance strategy according to method step d) is not possible, f) evaluating various collision strategies taking into account the seat occupancy according to a criterion for damage minimization, and g) selecting and passing a set of control signals to the vehicle control actuators to control operating characteristics of the vehicle in accordance with a collision strategy which is dependent upon seat occupancy information to produce a minimum consequence in terms of damage or injury in a collision.

\* \* \* \* \*